(12) United States Patent
Hannu et al.

(10) Patent No.: US 11,891,338 B2
(45) Date of Patent: Feb. 6, 2024

(54) CERAMIC COMPOSITE MATERIAL

(71) Applicant: Oulun yliopisto, Oulu (FI)

(72) Inventors: Jari Hannu, Oulu (FI); Jari Juuti, Oulu (FI); Heli Jantunen, Oulu (FI); Mikko Nelo, Oulu (FI); Tuomo Siponkoski, Oulu (FI); Hanna Kähäri, Oulu (FI)

(73) Assignee: Oulun yliopisto, Oulu (FI)

( * ) Notice: Subject to any disclaimer, the term of this patent is extended or adjusted under 35 U.S.C. 154(b) by 0 days.

(21) Appl. No.: 18/113,432

(22) Filed: Feb. 23, 2023

(65) Prior Publication Data
US 2023/0192553 A1 Jun. 22, 2023

Related U.S. Application Data

(62) Division of application No. 16/626,004, filed as application No. PCT/FI2018/050518 on Jun. 28, 2018, now Pat. No. 11,613,797.

(30) Foreign Application Priority Data

Jun. 30, 2017 (FI) ...................................... 20175635

(51) Int. Cl.
 C04B 35/00 (2006.01)
 B22F 3/02 (2006.01)
 C22C 1/051 (2023.01)
 C22C 32/00 (2006.01)
 B22F 1/052 (2022.01)

(52) U.S. Cl.
 CPC .............. C04B 35/00 (2013.01); B22F 1/052 (2022.01); B22F 3/02 (2013.01); C22C 1/051 (2013.01); C22C 32/0015 (2013.01); B22F 2302/25 (2013.01)

(58) Field of Classification Search
 CPC .................................................... C04B 35/00
 See application file for complete search history.

(56) References Cited

U.S. PATENT DOCUMENTS

| | | |
|---|---|---|
| 2002/0006988 A1 | 1/2002 | Behi et al. |
| 2009/0142578 A1 | 6/2009 | Riman et al. |
| 2009/0188789 A1 | 7/2009 | Honecker et al. |
| 2011/0010904 A1 | 1/2011 | Liufu et al. |
| 2015/0175486 A1 | 6/2015 | Roberts |
| 2017/0088471 A1 | 3/2017 | Randall et al. |
| 2020/0123638 A1 | 4/2020 | Hannu et al. |
| 2020/0239328 A1 | 7/2020 | Li |

FOREIGN PATENT DOCUMENTS

| | | |
|---|---|---|
| CN | 105347788 | 2/2016 |
| CN | 105693239 | 6/2016 |
| JP | 2008-127258 | 6/2008 |
| WO | 2013/073295 | 5/2013 |

OTHER PUBLICATIONS

International Search Report for PCT/FI2018/050518, dated Sep. 18, 2018, 7 pages.
Search Report for FI20175635, dated Jan. 30, 2018, 2 pages.
International Preliminary Report on Patentability for PCT/FI2018/050518, dated Sep. 16, 2019, 15 pages.
Hanna Kähäri et al., "Improvements and Modifications to Room-Temperature Fabrication Method for Dielectric Li 2 MoO 4 Ceramics", Journal of the American Ceramic Society, vol. 98, No. 3, Jan. 22, 2015, pp. 687-689.
Maria Väätäjä et al., "Li 2 MoO 4-based composite ceramics fabricated from temperature- and atmosphere-sensitive MnZn ferrite at room temperature", Journal of the American Ceramic Society, vol. 100, No. 8, Apr. 27, 2017, pp. 3626-3635.
Hanna Kähäri et al., "Room-temperature fabrication of microwave dielectric Li2MoO4—TiO2 composite ceramics", Ceramics International, vol. 42, 2016, pp. 11442-11446.
Jing Guo et al., "Cold Sintering: A Paradigm Shift for Processing and Integration of Ceramics", Aug. 11, 2016, Angew. Chem. Int. Ed. 2016, vol. 55, pp. 11457-11461.
I J Induja et al., "Microwave dielectric properties of mineral sillimanite obtained by conventional and cold sintering process", Journal of the European Ceramic Society, vol. 37, No. 5, Jan. 16, 2017, pp. 2143-2147.
Li He et al., "Low-Temperature Sintering Li 2 MoO 4 /Ni 0.5 Zn 0.5 Fe 2 O 4 Magneto-Dielectric Composites for High-Frequency Application", Journal of the American Ceramic Society, vol. 97, No. 8, Jun. 18, 2014, pp. 2552-2556.
Dawei Wang et al., "Cold-Sintered Temperature Stable Na 0.5 Bi 0.5 MoO 4—Li 2 MoO 4 Microwave Composite Ceramics", ACS Sustainable Chemistry & Engineering, vol. 6, No. 2, Jan. 5, 2018, pp. 2438-2444.
Jon-Paul Maria et al., "Cold Sintering: Current Status and Prospects", Journal of Materials Research, vol. 32, No. 17, Jul. 18, 2017, pp. 3205-3218.

(Continued)

*Primary Examiner* — Christopher S Kessler
(74) *Attorney, Agent, or Firm* — Nixon & Vanderhye PC

(57) ABSTRACT

A process for manufacturing ceramic-metal composite material, comprises dissolving ceramic powder into water to obtain an aqueous solution of ceramic; mixing metal powder having a multimodal particle size where largest particle size is one fourth of the minimum dimension of a device, with the aqueous solution of ceramic to obtain a powder containing ceramic precipitated on the surface of metal particles; mixing the powder containing ceramic precipitated on the surface of the metal particles, with ceramic powder having a particle size below 50 μm, to obtain a powder mixture; adding saturated aqueous solution of ceramic to the powder mixture to obtain an aqueous composition containing ceramic and metal; compressing the aqueous composition to form a disc of ceramic-metal composite material containing ceramic and metal; and removing water from the ceramic-metal composite material; wherein ceramic content of the disc is 10 vol-% to 35 vol-%. Alternatively, ceramic-ceramic composite material may be manufactured.

8 Claims, No Drawings

(56) References Cited

OTHER PUBLICATIONS

Prasadh Ramachandran et al., "Room temperature densified ceramics for weight optimized circular polarized GPS antenna design", Microwave and Optical Technology Letters, vol. 60, No. 4, Mar. 2018, pp. 1061-1066.

I J Induja et al., "Microwave dielectric properties of cold sintered Al2O3—NaCl composite", Materials Letters, vol. 211, Sep. 24, 2017, pp. 55-57.

Office Action dated Sep. 1, 2021 in corresponding Chinese Application No. 201880055581.5 (with English-language translation), 9 pages.

CERAMIC COMPOSITE MATERIAL

CROSS-REFERENCES TO RELATED APPLICATIONS

This application is a divisional of U.S. application Ser. No. 16/626,004 filed Dec. 23, 2019, which is a National Phase of International Application No. PCT/FI2018/050518 filed Jun. 28, 2018, which claims priority to Finnish Application No. 20175635 filed Jun. 30, 2017, the entire contents of each of which are hereby incorporated by reference.

FIELD OF THE INVENTION

The invention relates to a ceramic composite material, and more particularly to preparation of such material.

BACKGROUND

Ceramic materials are used in a wide range of industries, including mining, aerospace, medicine, refinery, food and chemical industries, packaging science, electronics, industrial and transmission electricity, and guided lightwave transmission. In composite materials made from metal and ceramics, a metallic substrate material is reinforced with ceramic hardened particles. This makes it possible to combine the low weight of the metal with the resistance of ceramics. Ceramic composite materials may be used for the manufacture of electronic components. Electronic components may be active components such as semiconductors or power sources, or passive components such as resistors or capacitors.

SUMMARY

According to an aspect, there is provided the subject matter of the independent claims. Embodiments are defined in the dependent claims.

One or more examples of implementations are set forth in more detail in the description below. Other features will be apparent from the description and from the claims.

DETAILED DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising", "containing" and "including" should be understood as not limiting the described embodiments to consist of only those features that have been mentioned and such embodiments may contain also features/structures that have not been specifically mentioned.

$Li_2MoO_4$ ceramics may be prepared at room-temperature based on utilization of a small amount of water with $Li_2MoO_4$ powder. The densification of the ceramic takes place by pressing and removal of excess water. Thus the shape and size of the ceramic object may be adjusted by controlling the mould dimensions and the amount of ceramic material. Post-processing may be applied at 120° C. to remove residual water from the object. However, the post-processing step is not mandatory, or the post-processing step may performed at a temperature lower than 120° C. The dielectric properties obtainable by the low temperature ceramic material may be similar to those achieved for $Li_2MoO_4$ ceramics fabricated by sintering at 540° C. (e.g. relative permittivity of 5.1, and a loss tangent value of 0.00035 at 9.6 GHz).

In an embodiment, the ceramic composite material contains lithium molybdate $Li_2MoO_4$.

In an embodiment, instead of or in addition to lithium molybdate $Li_2MoO_4$, the ceramic composite material may contain NaCl, $Na_2Mo_2O_7$, $K_2Mo_2O_7$, $(LiBi)_{0.5}MoO_4$, $KH_2PO_4$, $Li_2WO_4$, $Mg_2P_2O_7$, and/or $V_2O_5$, for example.

Lithium molybdate $Li_2MoO_4$ may be used as a raw material to prepare the ceramic composite material. The raw material may be argillaceous (clayish) material, paste, slurry, or a less viscous fluid that enables forming or molding of the material according to an embodiment.

The process for the manufacture of an electronic component comprising the ceramic composite material containing lithium molybdate, may include pressure molding (press molding), molding (slip casting), dipping, or 2D/3D printing (two-dimensional or three-dimensional printing).

Thus an embodiment discloses an electronic component comprising an electronic component comprising ceramic composite material containing lithium molybdate $Li_2MoO_4$. The electronic component may comprise at least one of a battery, an electrical connection path, and conditioning electronics.

An embodiment relates to ceramic-metal composites. Another embodiment relates to ceramic-ceramic composites. Ceramic materials are extremely durable and stable as such. The characteristics of the ceramic material may be changed by adding metals or another type of ceramic to the ceramic matrix material. Metals typically are tensile and durable materials and have a high thermal conductivity. Ceramics typically are chemically stable and inoxidizable, and they have a high melting temperature. An exemplary ceramic-metal composite enables combining the optimum characteristics of both the metal(s) and the ceramic(s), such as the hardness and high thermal strength of the ceramic(s), and the conductivity of the metal(s). An exemplary ceramic-ceramic composite enables combining the optimum characteristics of different ceramic materials, such as versatile electrical and magnetic performances, including ferroelectric, pyroelectric, piezoelectric, ferrite, high dielectric and ferromagnetic characteristics.

An exemplary ceramic-metal composite material may be used for manufacturing of electronic components such as resistors, capacitors and other electronic components. Exemplary ceramic-metal composite materials may also be used in machine tools to substitute metal blades. Exemplary ceramic-ceramic and/or ceramic-metal composite materials may also be used in sensors to substitute conventional high temperature piezoelectric ceramics, and magnetic materials in ferrite applications, such as the core of the coils. Exemplary ceramic-metal composites and/or ceramic-ceramic composites may also be used at ceramic-metal interfaces, in biomedicine, as friction materials in brakes, in optoelectronic components, and/or as splinterproof in armoured vehicles.

An exemplary ceramic-ceramic composite material may be used for manufacturing of electronics components, such as capacitors, coils, sensors, actuators, high frequency passive devices, energy storage and harvesting, tuning elements and transformers.

An advanced ceramic-metal composite material and a method for manufacturing the advanced ceramic-metal composite material are disclosed. Further, an advanced ceramic-ceramic composite material and a method for manufacturing the advanced ceramic-ceramic composite material are disclosed. Exemplary ceramic-metal and ceramic-ceramic composite materials may be used for the production of resistors, capacitors and/or conductors in low temperature manufacture of electronics (e.g. printed electronics). The low temperature (e.g. room temperature) manufacture enables an energy saving manufacture of the electronic component. In the low temperature manufacture, diffusion between the metal and ceramic phases does not occur or is minimal, which enables improving the electrical properties of the material as the ceramic and the metal maintain their original dielectric, ferroelectric and magnetic properties. Thus, the formation of additional phases of e.g. lossy material may be prevented or reduced.

An embodiment discloses a process for manufacturing ceramic-metal composites. Another embodiment discloses a process for manufacturing ceramic-ceramic composites. The ceramic contains, for example, lithium molybdate ($Li_2MoO_4$) which crystallizes at room temperature. Instead of/in addition to lithium molybdate, the ceramic may contain NaCl, $Na_2Mo_2O_7$, $K_2Mo_2O_7$, $(LiBi)_{0.5}MoO_4$, $KH_2PO_4$, $Li_2WO_4$, $Mg_2P_2O_7$, and/or $V_2O_5$, for example. The ceramic-metal composite contains metal particles (e.g. Al, Fe, Ni, Co, Ag, Cu, $Tb_xDy_{1-x}Fe_2$, NdFeB, $SmCo_5$, and/or other elements or alloys that enable obtaining the required thermal, electrical and/or magnetic functionalities) as additives. The ceramic-ceramic composite contains ceramic particles (e.g. PZT, $Ba_xSr_{1-x}TiO_3$, $TiO_2$, $Al_2O_3$, KNBNNO and related, ferrites and related, and/or other electroceramic materials).

An exemplary process for manufacturing ceramic-metal or ceramic-ceramic composites comprises preparing metal or ceramic powder having a multimodal particle size where the largest particle size is one fourth of the minimum dimension of the electronic device. The process further comprises dissolving $Li_2MoO_4$ powder into water to obtain an aqueous solution of $Li_2MoO_4$. The metal or ceramic powder is mixed with the aqueous solution of $Li_2MoO_4$.

A powder is thus obtained, containing $Li_2MoO_4$ precipitated on the surface of the metal or ceramic particles, which powder is mixed with lithium molybdate having a particle size below 50 µm. The powder thus contains $Li_2MoO_4$ in water, $Li_2MoO_4$ particles as mentioned above and metal or ceramic particles producing the electrical functionality. The amount of $Li_2MoO_4$ in the ceramic-metal or ceramic-ceramic composite is from 10 to 30 vol-% compared to metal or ceramic material. For example, 0.1-0.5 ml of saturated aqueous solution of $Li_2MoO_4$ is then added to 0.8-1.2 g of the powder mixture to obtain a composition. The composition thus obtained is then compressed in a mould (e.g. in a 10 mm diameter mould) by using a moulding pressure of e.g. 250 MPa to form a solid disc. The water content of the composition/the disc after the compression moulding is to be 2.5-3.0 wt-%. A water content above 3 wt-% may make the handling of the discs difficult. The $Li_2MoO_4$ content of the final product may be 14-35 vol-%.

The discs may be dried in an oven for 16 h at a temperature of 120° C. to remove water residual. Alternatively, the discs may be dried at room temperature, or at any temperature from 20° C. to 120° C., but in that case a longer drying time is required. After drying, the surfaces of the discs are polished to remove adhered impurities and to obtain a smooth surface for the electrodes. The electrodes may then be prepared on the disc surface by using silk screen printing ink, for example.

Thus an exemplary process for manufacturing ceramic-metal or ceramic-ceramic composites comprises using metal or ceramic particles having a multimodal particle size (e.g. below 180 µm) where the largest particle size is one fourth of the minimum dimension of the electronic device, and lithium molybdate particles having a small particle size (i.e. below 50 µm), wherein a saturated aqueous solution of $Li_2MoO_4$, and compression moulding in an anti-adhesive mould at a pressure of 250 MPa, are used to obtain the discs. Alternatively 3D printing may be used to obtain the discs. The ceramic-metal and ceramic-ceramic composites are usable in various applications including electronics applications such as materials used in printed electronics. The ceramic-metal composites may be thermally conductive, and have a high thermal strength and a wide range of properties typical for electroceramics.

In an embodiment, instead of or in addition to lithium molybdate $Li_2MoO_4$, the ceramic-metal or ceramic-ceramic composite material may contain NaCl, $Na_2Mo_2O_7$, $K_2Mo_2O_7$, $(LiBi)_{0.5}MoO_4$, $KH_2PO_4$, $Li_2WO_4$, $Mg_2P_2O_7$, and/or $V_2O_5$, for example.

A process for manufacturing the ceramic-metal composite material, comprises dissolving $Li_2MoO_4$ or other ceramic powder into water to obtain an aqueous solution of $Li_2MoO_4$ or said other ceramic; mixing metal powder having a multimodal particle size where largest particle size is one fourth of the minimum dimension of an electronic device, with the aqueous solution of $Li_2MoO_4$ or other ceramic to obtain a powder containing $Li_2MoO_4$ or said other ceramic precipitated on the surface of metal particles; mixing the powder containing $Li_2MoO_4$ or said other ceramic precipitated on the surface of the metal particles, with $Li_2MoO_4$ or said other ceramic powder having a particle size below 50 µm, to obtain a powder mixture; adding saturated aqueous solution of $Li_2MoO_4$ or said other ceramic to the powder mixture to obtain an aqueous composition containing $Li_2MoO_4$ or said other ceramic, and metal; compressing the aqueous composition in a mould by using a moulding pressure, to form a disc of ceramic-metal composite material containing $Li_2MoO_4$ or said other ceramic, and metal; drying the disc to remove water from the ceramic-metal composite material; wherein $Li_2MoO_4$ or said other ceramic content of the disc is 10 vol-% to 35 vol-%.

The metal comprises Al, Fe, Ni, Co, Ag, Cu, $Tb_xDy_{1-x}Fe_2$, NdFeB, $SmCo_5$, and/or other metal element or metal alloy.

Said other ceramic contains at least one of NaCl, $Na_2Mo_2O_7$, $K_2Mo_2O_7$, $(LiBi)_{0.5}MoO_4$, $KH_2PO_4$, $Li_2WO_4$, $Mg_2P_2O_7$, and $V_2O_5$.

A process for manufacturing ceramic-ceramic composite material, comprises dissolving first ceramic powder containing $Li_2MoO_4$ or other ceramic, into water to obtain an aqueous solution of a first ceramic; mixing second ceramic powder having a multimodal particle size where largest particle size is one fourth of the minimum dimension of an electronic device, with the aqueous solution of the first ceramic to obtain a powder containing first ceramic precipitated on the surface of second ceramic particles; mixing the powder containing first ceramic precipitated on the surface of the second ceramic particles, with the first ceramic powder having a particle size below 50 µm, to obtain a powder mixture; adding saturated aqueous solution of the first ceramic to the powder mixture to obtain an aqueous composition containing the first and second ceramic; compressing the aqueous composition in a mould by using a moulding pressure, to form a disc of ceramic-ceramic composite material containing first and second ceramic; drying the disc to remove water from the ceramic-ceramic composite material; wherein first ceramic content of the disc is 10 vol-% to 35 vol-%.

The first ceramic contains at least one of $Li_2MoO_4$, NaCl, $Na_2Mo_2O_7$, $K_2Mo_2O_7$, $(LiBi)_{0.5}MoO_4$, $KH_2PO_4$, $Li_2WO_4$, $Mg_2P_2O_7$, $V_2O_5$. The second ceramic contains at least one of PZT, $Ba_xSr_{1-x}TiO_3$, $TiO_2$, $Al_2O_3$, KNBNNO and related, ferrites and related, and other electroceramic material. The first and second ceramic are different from each other.

The compressing of the aqueous composition may be performed by using a moulding pressure of 100 to 500 MPa, preferably 250 MPa.

The disc may be dried for at least 16 h at a temperature from 20° C. to 120° C., preferably for 16 h at a temperature of 120° C.

After drying, the surface of the disc may be polished to obtain a smooth disc surface, wherein electrodes are prepared on the smooth disc surface (e.g. by printing).

The ceramic-metal composite material may have a ceramic content of 10 vol-% to 35 vol-%, and comprises metal powder having a multimodal particle size where largest particle size is one fourth of the minimum dimension of an electronic device (electronic component). The ceramic-metal composite material is obtainable by the above process.

The ceramic-ceramic composite material may have a first ceramic content of 10 vol-% to 35 vol-%, and comprises second ceramic powder having a multimodal particle size where largest particle size is one fourth of the minimum dimension of an electronic device (electronic component). The ceramic-ceramic composite material is obtainable by the above process.

An electronic component is disclosed, comprising the ceramic-metal or ceramic-ceramic composite material. The electronic component may comprise at least one of a resistor, conductor and capacitor.

The ceramic-metal or ceramic-ceramic composite material may be used in electronic components, such as resistors, capacitors, coils, sensors, actuators, high frequency passive devices, energy storage and harvesting, tuning elements and/or transformers.

An electronic product is disclosed, comprising the electronic component.

The particle size of the second ceramic powder may be above 50 μm. This enables maximizing the amount of second ceramic powder in the composite material. The amount of the second ceramic powder in the composite material may be above 65 vol-%. Thus the second ceramic powder may be the dominant element in the composite.

The second ceramic powder may be formed of insoluble metal/ceramic, and more than 65 vol-% of the composite material may be formed of the second ceramic powder.

The particle size distribution of the insoluble particles is multimodal, wherein the largest particles have a particle size of more than 50 μm. This enhances the filling of the mould and preparation of the disc.

The temperature in the process for manufacturing the composite material does not exceed 150° C., nor does it need to exceed the boiling temperature of the solution. No extra heating is required in the process during the compressing, instead the compression may be performed at a room temperature. Optional heat treatment may be performed after the compressing and compacting of the disc. The process time to prepare the disc may be only 2 to 5 min.

It will be obvious to a person skilled in the art that, as the technology advances, the inventive concept can be implemented in various ways. The invention and its embodiments are not limited to the examples described above but may vary within the scope of the claims.

What is claimed is:

1. A process for manufacturing ceramic-ceramic composite material, the process comprising:
   obtaining an aqueous solution of a first ceramic by dissolving powder of said first ceramic into water;
   obtaining a powder containing said first ceramic precipitated on the surface of particles of a second ceramic by mixing powder of said second ceramic having a multimodal particle size where largest particle size is above 50 μm and less than 180 μm, with the aqueous solution of said first ceramic;
   obtaining a powder mixture by mixing the powder containing said first ceramic precipitated on the surface of the particles of said second ceramic, with powder of said first ceramic having a particle size below 50 μm;
   obtaining an aqueous composition containing said first ceramic and second ceramic, by adding saturated aqueous solution of said first ceramic to the powder mixture;
   forming a disc of ceramic-ceramic composite material containing said first ceramic and second ceramic, by compressing the aqueous composition in a mould;
   removing water from the ceramic-ceramic composite material by drying the disc;
   wherein the content of said first ceramic is 10 vol-% to 35 vol-%, and the content of said second ceramic is above 65 vol-%, in the disc, and
   wherein said first ceramic contains at least one of $Li_2MoO_4$, $Na_2Mo_2O_7$, $K_2Mo_2O_7$, $(LiBi)_{0.5}MoO_4$, $Li_2WO_4$, $Mg_2P_2O_7$, and $V_2O_5$.

2. A process according to claim 1, wherein said second ceramic contains at least one of PZT, $Ba_xSr_{1-x}TiO_3$, $TiO_2$, $Al_2O_3$, KNBNNO, ferrite ceramic material, and other electroceramic material; wherein said first and second ceramic are different from each other.

3. A process according to claim 1, wherein the compressing of the aqueous composition is performed by using a moulding pressure of 100 to 500 MPa.

4. A process according to claim 1, wherein the disc is dried for at least 16 h at a temperature from 20° C. to 120° C.

5. A process according to claim 1, wherein after drying, the surface of the disc is polished to obtain a smooth disc surface, wherein electrodes are prepared on the smooth disc surface.

6. A process according to claim 1, wherein after drying, the surface of the disc is polished to obtain a smooth disc surface, wherein electrodes are prepared on the smooth disc surface by printing.

7. A process according to claim 1, wherein the compressing of the aqueous composition is performed by using a moulding pressure of 250 MPa.

8. A process according to claim 1, wherein the disc is dried for 16 h at a temperature of 120° C.

* * * * *